United States Patent [19]

Mochizuki et al.

[11] Patent Number: 5,048,922
[45] Date of Patent: Sep. 17, 1991

[54] OPTICAL FIBER CABLE

[75] Inventors: Kiyofumi Mochizuki, Hachioji; Yoshinori Namihira; Makoto Nunokawa, both of Kawasaki; Yoshinao Iwamoto, Fujimi; Hitoshi Yamamoto, Yamato, all of Japan

[73] Assignee: Kokusai Denshin Denwa Kabushiki Kaisha, Tokyo, Japan

[21] Appl. No.: 145,662

[22] Filed: Jan. 14, 1988

Related U.S. Application Data

[63] Continuation of Ser. No. 915,893, Oct. 6, 1986, abandoned, which is a continuation of Ser. No. 638,750, Aug. 8, 1984, abandoned.

[30] Foreign Application Priority Data

Aug. 18, 1983 [JP]  Japan ................................ 58-149643

[51] Int. Cl.$^5$ .............................................. G02B 6/44
[52] U.S. Cl. .................................................. 385/103
[58] Field of Search ...................................... 350/96.23

[56] References Cited

U.S. PATENT DOCUMENTS

| 4,365,865 | 12/1982 | Stiles | 350/96.23 |
| 4,371,234 | 2/1983 | Parfree et al. | 350/96.23 |
| 4,372,792 | 2/1983 | Dey et al. | 350/96.23 |
| 4,467,138 | 8/1984 | Brorein | 350/96.23 |

FOREIGN PATENT DOCUMENTS 2084757  4/1982  United Kingdom ............. 350/96.23

Primary Examiner—William L. Sikes
Assistant Examiner—Robert E. Wise
Attorney, Agent, or Firm—Emmanuel J. Lobato; Robert E. Burns

[57] ABSTRACT

An optical fiber cable in which at least those metallic members of the optical fiber cable which are of high chemical reactivity and electrochemical reactivity are each precoated with a film for preventing them from making direct contact with water when it diffuses into the cable. The film may be a nonmetallic film or a metallic film of low chemical reactivity and electrochemical reactivity.

8 Claims, 4 Drawing Sheets

OPTICAL FIBER CABLE

This is a continuation application of application Ser. No. 06/915,893 filed 10/06/86 and now abandoned which is a continuation of Ser. No. 638,750 filed 8/8/84 and now abandoned.

BACKGROUND OF THE INVENTION

The present invention relates to improvements in an optical fiber cable structure and, more particularly, to an optical fiber cable which is effective when laid on the bottom of the water or sea.

With the improvement of the optical fiber structure for a reduced transmission loss and with the enhancement of the characteristics of optical devices such as a semiconductor laser and so on, optical communication is now making a great advance towards its practical application. Under such a situation, the elevation of the reliability of each part constituting a fiber optic communication system is an important problem for its practical application; in particular, the improvement of the long-term stability of the transmission characteristic of the optical fiber is indispensable.

Heretofore, it has been considered that the transmission loss by the optical fiber is fluctuated by its microbending or ambient temperature variations but undergoes substantially no variations with the lapse of time. Therefore, a main problem of conventional optical fiber cables is how optical fibers, which are very fragile mechanically, are protected from any external pressure such as a water pressure or tension, and various cable structures have been proposed.

In various experiments conducted by the present inventor on variations in the transmission characteristics by water entering into optical fiber cables in consideration of the fact that the optical fiber cables are laid on a river bed or sea bed under a high water pressure and may sometimes be broken by fishing implements, an anchor of a fishing boat and so forth, it has been found that when water diffuses into the optical fiber cable, a sharp light absorbing spectrum for a particular wavelength appears in a short time. It has also been ascertained that the higher the water pressure is, the larger the light absorbing spectrum becomes. This phenomenon is a fatal defect of a system which is required to have a design lifetime of more than 20 years, such as an international fiber optic communication system.

SUMMARY OF THE INVENTION

An object of the present invention is to provide an optical fiber cable which obviates possible defects of the prior art which could be supposed on the basis of the abovesaid experimental results and which is capable of preventing degradation of the transmission characteristics even if water diffuses into the optical fiber cable.

To attain the above object of the present invention, an optical fiber cable is proposed in which at least those of metallic members of the optical fiber cable which are of high chemical reactivity and electrochemical reactivity are each precoated with a film for preventing them from making direct contact with water when it diffuses into the cable. The film may be a nonmetallic film or a metallic film of low chemical reactivity and electrochemical reactivity.

BRIEF DESCRIPTION OF THE DRAWINGS

The present invention will be described in detail below with reference to the accompanying drawings, in which.

DETAILED DESCRIPTION

A description will be given first of the outline of the abovesaid experiments and the cause of deterioration of the transmission characteristics, which is followed by a detailed description of its solution.

Figure 1:
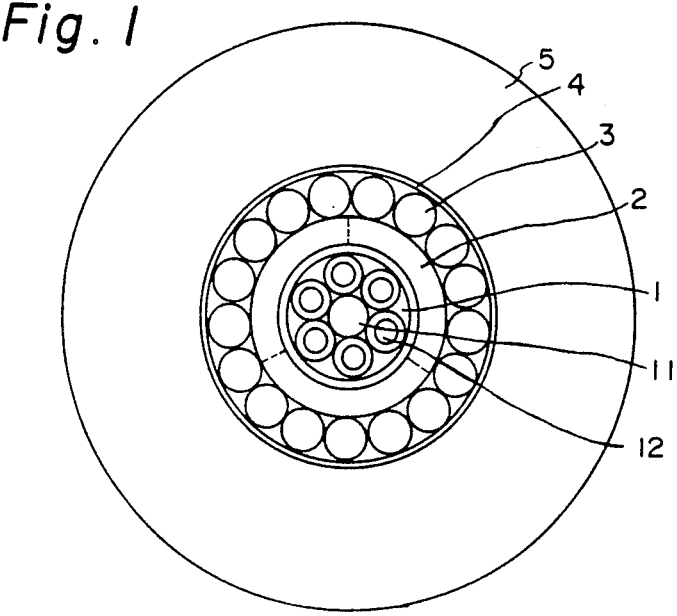
FIG. 1 is a cross-sectional view illustrating an example of a conventional optical fiber cable.

FIG. 1 is a cross-sectional view of a conventional type optical fiber cable used in the experiment. Reference numeral 1 indicates a nylon-covered fiber unit in which a plurality of nylon-covered optical fibers 12 are intertwined around a central tension-resisting member 11 and gaps are filled with silicone rubber or the like; 2 designates a pressure-tight structure which is made of aluminum and divided longitudinally as indicated by the broken lines and also serves as a power-supplying feeder; 3 identifies tension-resisting members made up of steel wires; 4 denotes a copper tape; and 5 represents a sheath of polyethylene. Incidentally, the optical fibers 12 are single-mode fibers formed of quartz glass ($SiO_2$).

Figure 2:
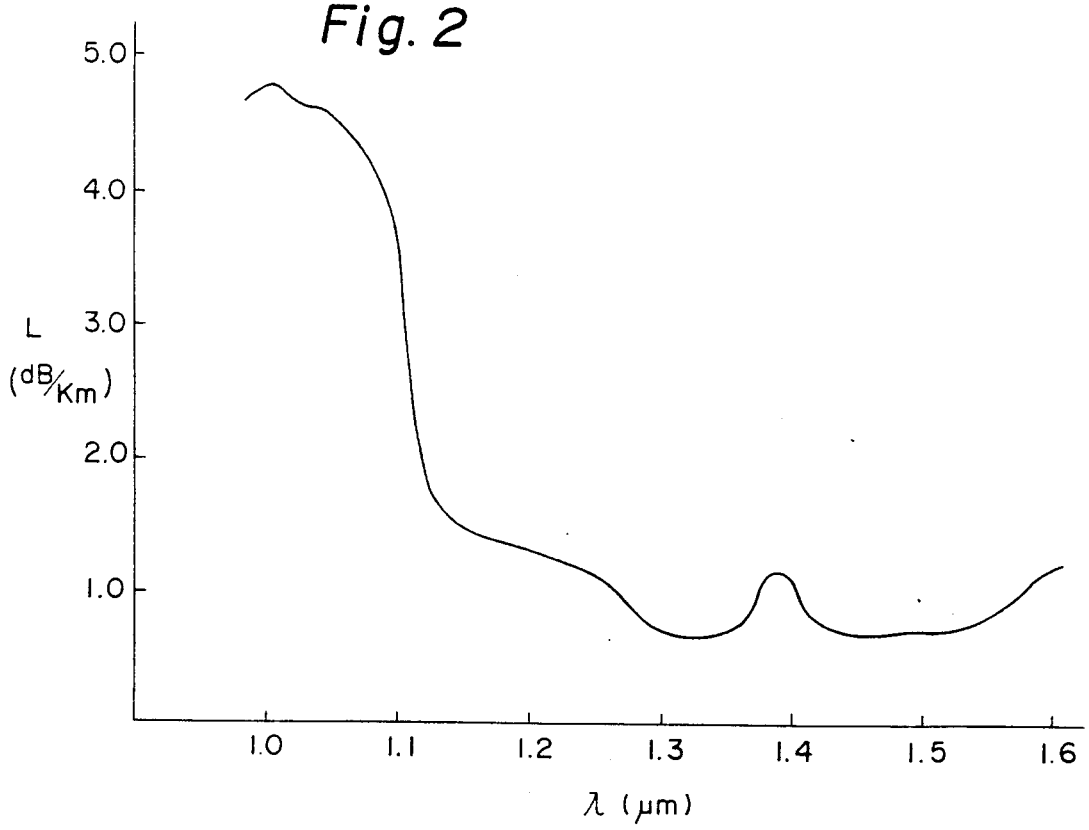
FIG. 2 is a graph showing the transmission characteristic of the prior art example depicted in FIG. 1.
Figure 3:
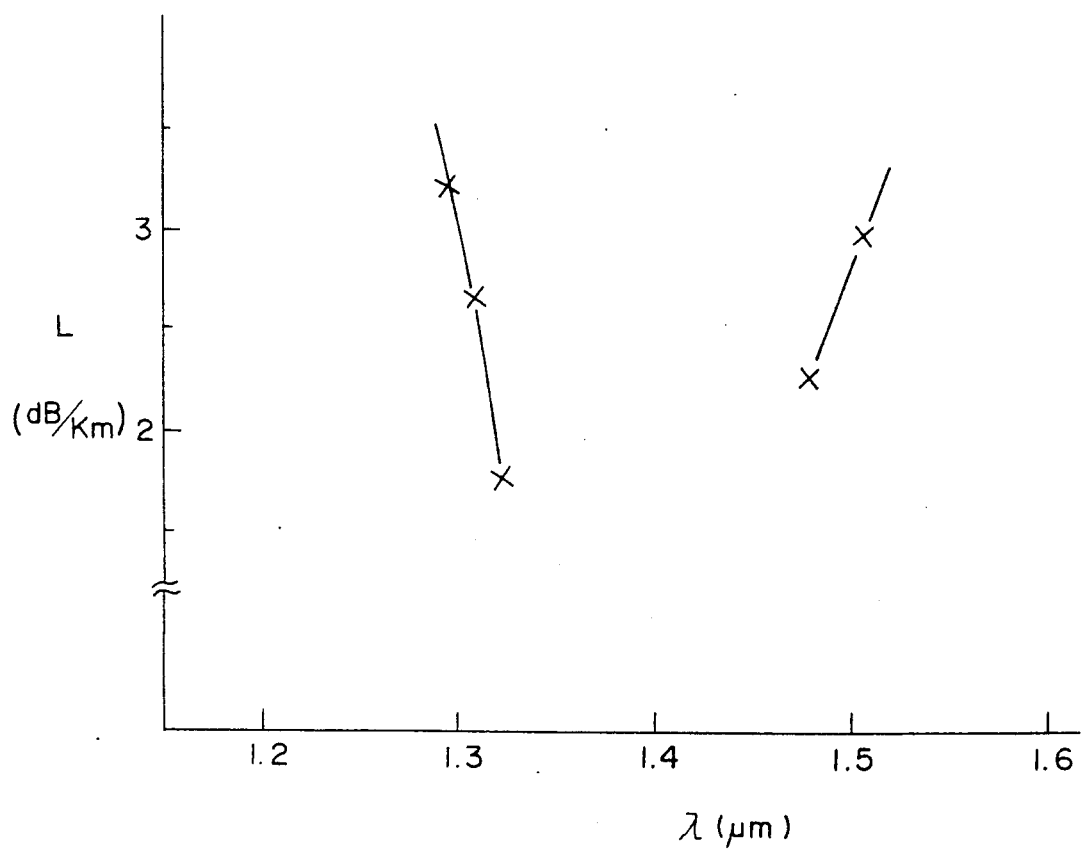
FIG. 3 is a graph showing the transmission characteristic measured when water diffused into the conventional optical fiber cable.

FIG. 2 shows the static transmission characteristic of the optical fiber cable depicted in FIG. 1. The cut-off point of the single mode is allotted at the vicinity of a wavelength 1.12 $\mu$m, and the transmission loss increases in shorter wavelength bands. The wavelength bands that are now contemplated for optical communication are 1.3 and 1.5 $\mu$m bands, in which no problems arise. In the aforementioned experiment, a shortend cable of the structure shown in FIG. 1 was submerged under a pressure of about 25 Kg/cm$^2$. The experiment was originally intended to ascertain the amount and speed of water diffusing between the fiber unit 1 and the pressure-tight structure 2 and into the silicone rubber of the fiber unit 1 and the gaps defined between the tension-resisting members 3, but in this experiment it was recognized that the transmission characteristic of the optical fiber underwent substantial changes from the characteristic shown in FIG. 2, as illustrated in FIG. 3. FIG. 3 shows the experimental results measured at 1.29, 1.31, 1.32, 1.48 and 1.51 $\mu$m because of limitations on the wavelength of a light source of the measuring system used. An increase in the loss was great and sharp with respect to wavelength deviation, so that it was supposed that the loss had a peak at a particular wavelength. It could not easily be clarified what caused the loss peak, but on the assumption that one peak would exist between 1.2 and 1.3 $\mu$m, it was hypothesized that the loss peak would result from the existence of a light absorbing spectrum by hydrogen molecules. The reason is that the fundamental oscillation of the hydrogen molecules is at 2.4 $\mu$m and its overtone can be considered to lie around a wavelength of 1.2 $\mu$m.

Figure 4:
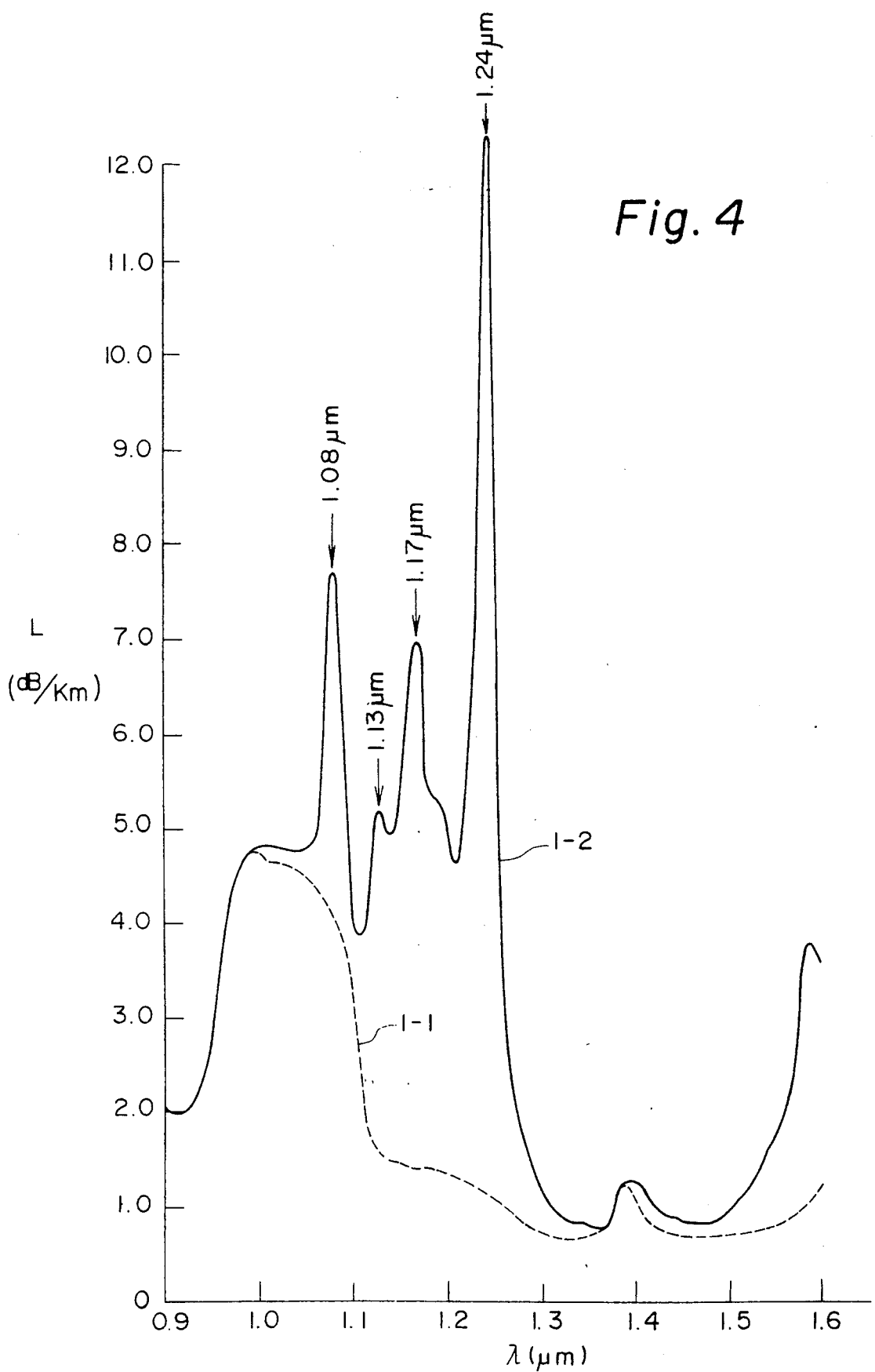
FIG. 4 is a graph explanatory of fluctuations in the transmission characteristic when the optical fiber was allowed to stand in hydrogen gas.

To verify this hypothesis, the following supplemental experiment was conducted: A long optical fiber of about 1 kilo-meters was allowed to stand in hydrogen gas under 1.8 atm for a week in a pressure tank. The transmission characteristic measured thereafter is such as shown in FIG. 4, from which it is seen that there are four loss peaks at 1.24, 1.08, 1.13 and 1.17 μm. Further, it was asscertained that when the optical fiber taken out of the pressure tank was allowed to stand in the air, the amount of loss at each loss peak gradually diminished with the lapse of time and substantially the same characteristic as the original one indicated by the broken line in FIG. 4 was finally obtained again.

It was supposed from the above supplemental experiment that the aforementioned light absorbing phenomenon would not be caused by a chemical reaction of hydrogen molecules or hydrogen ions with the $SiO_2$ of which the optical fiber was made but by the diffusion of hydrogen molecules into the core of the optical fiber. Moreover, it was also found that an increase in the hydrogen gas pressure in the pressure tank increased the rate of occurrence of the loss peaks to increase the amount of loss.

The above various experimental results have proved that the hypothesis that the light absorption would be caused by the hydrogen molecules is correct.

The occurrence of the loss peaks by the hydrogen molecules at four specific wavelengths is explainable as follows:

The hydrogen molecules diffuse very easily into such an amorphous material, such as $SiO_2$ glass, of which the optical fiber is made and, in particular, under a pressurized condition, they are absorbed to the $SiO_2$ glass. The fundamental oscillation of the hydrogen molecules is caused at $4160$ cm$^{-1}$ ($2.42$ μm), but since the hydrogen molecules have no dipole moment, it is generally said that no infrared light absorption occurs. It is pointed out, however, that in a so-called absorbed state in which the hydrogen molecules loosely link with other molecules under the influence of pressure, temperature or the like, as described previously, absorption by the molecules having no dipole moment is also found in its fundamental oscillation. The 1.24 μm band at which an absorption peak occurred in the experiment is the first overtone. On the other hand, it is known that the fundamental oscillation of $SiO_2$ molecules of a tetrahedral structure exist at 9.1, 12.5, 21 and 36.4 μm, and the combinational vibrations of the overtones and the second harmonic 1.24 μm of the first overtone of the hydrogen molecules correspond to 1.09, 1.13, 1.17 and 1.2 μm, respectively, which agree with the experimental results shown in FIG. 4. Further, the increased loss in the wavelength band more than 1.5 μm, in FIG. 4, indicates the influence of absorption due to the fundamental oscillation of the hydrogen molecules and the fundamental oscillation of the tetrahedral $SiO_2$ molecules.

Thus, the experimental results shown in FIG. 3 are in good agreement with the results in FIG. 4, and it can be concluded that the light absorption is caused by the hydrogen molecules.

Next, a description will be given of the factor of generation of hydrogen molecules in the case of water diffusing into the optical fiber shown in FIG. 1.

As described previously, when the cross section of a cable is exposed to water, the water diffuses into the cable lengthwise thereof from gaps in its cross-sectional structure, resulting in the central tension-resisting member 11 of the fiber unit 1, the pressure-tight structure 2, the tension-resisting member 3 and the copper tape 4 making direct contact with the water over an appreciably long length. Of these cable members, the central tension-resisting member 11, the pressure-tight structure 2 and the tention-resisting member 3, which are made of aluminum (Al) or iron (Fe) of a large chemical reactive force or an electrochemical force, each causes a chemical reaction singly. Especially, since the pressure-tight structure 2 formed of aluminum is used as a power-supplying feeder, a current supply thereto is accompanied by an electrode action, by which the chemical reaction is further promoted. There is the possibility of generation of the hydrogen molecules by this chemical reaction. Moreover, since aluminum and iron which are dissimilar metals are different in checmial reactive force, a potential difference develops to cause an electrolysis of the water therebetween, thereby generating hydrogen molecules.

The factor of generation of the hydrogen molecules can be presumed as described above.

Next, a description will be given of a solution for preventing the degradation of the transmission characteristic according to the present invention.

The abovesaid dominant cause of generation of the hydrogen molecules indicates that the basis of the solution is a cable structure which does not permit a checmial or electrochemical reaction with water or sea water. In this case, however, the cable structure must be one that takes into account the cost and ease of cable fabrication.

A first embodiment of the present invention resides in that the central tension-resisting member 11 of the fiber unit 1 is formed of a non-metallic material, for instance, FRP, in the cable structure shown in FIG. 1. With this, it is possible to prevent the chemical reaction of the central tension-resisting member 11 and the electrochemical reaction with the pressure-tight structure 2, thus avoiding the generation of hydrogen in the vicinity of the optical fibers 12.

A second embodiment of the invention is to form a cable through using a metal of weak chemical reaction or electrochemical reactive force. A cable which need not be high in tensile strength sometimes may not involve the tention-resisting member 4 depicted in FIG. 1. In such a case, the pressure-tight structure 2 is formed of copper (Cu) and the central tension-resisting member 11 is formed of copper (Cu) or a non-metallic material. Metals of low chemical or electrochemical reactivity can be selected through utilizing their ionization tendency as a measure. The reason is that metals of lower ionization tendency than that of hydrogen lessen the danger of generating the hydrogen molecules. Of such metals, copper (Cu) is the best in terms of cost and workability.

A third embodiment of the invention is to form a cable through using similar metals. This prevents the generation of an electric field which is established when dissimilar metals are employed as referred to previously. A high tensile strength is required from a cable which is laid on the sea bed, and in this case, there is no choice but to use a steel wire as the tension-resisting member 3. Such a requirement can be satisfied by forming the pressure-tight structure 2 of iron (Fe) in the structure shown in FIG. 1. Incidentally, in the case of this embodiment, since the pressure-tight structure 2 serving as a power-supplying feeder is also made of iron (Fe), the electrical resistance of the power-supplying feeder increases. In this case, power feeding is effected through the copper tape 4 which is disposed outside the tension-resisting member 3 and is of low chemical reactive force. This defect is also settled by the following embodiment.

A fourth embodiment of the invention is to give metallic coatings to all metallic members used or those of them which are of strong chemical or electrochemical reactive force, forming a cable of equivalently similar metals. As the metallic coatings can be used metals which have a lower ionization tendency than does hydrogen, such as Cu, Ag, Pt, Au and so forth, but copper (Cu) plating is advisable from the economical point of view. By plating the central tension-resisting member 11, the pressure-tight structure 2 and the tension-resisting member 3 with copper in FIG. 1, the cable including the copper tape 4 can be formed of the same metal equivalently, and this does not cause any variations in the function and characteristic as an optical fiber cable. In this case, by forming the central tension-resisting member 11 of a nonmetallic material, generation of the hydrogen molecules can further be prevented.

Figure 5:
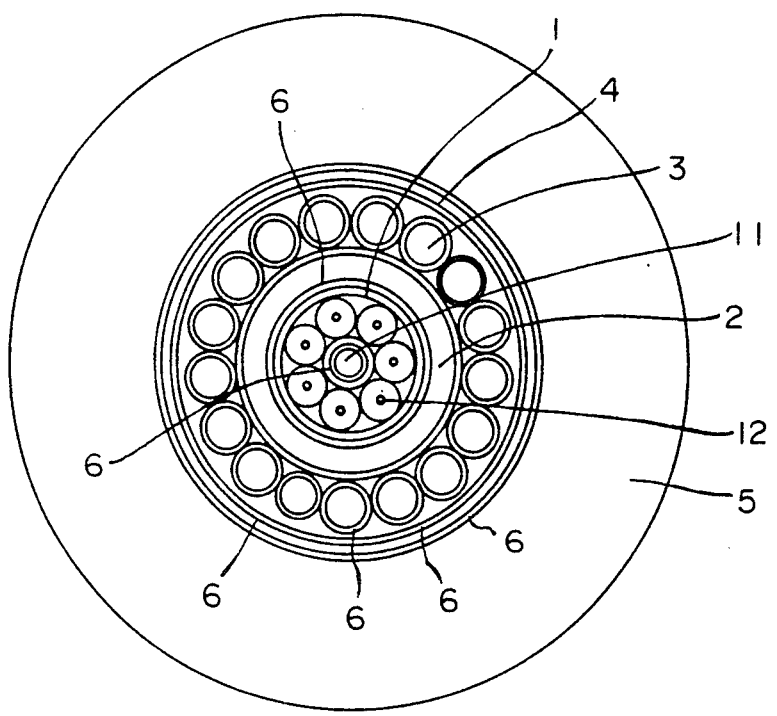
FIG. 5 is a cross-sectional view illustrating an embodiment of the present invention.

A fifth embodiment of the invention is to prevent direct contact between water or sea water diffusing into the cable and the metallic members thereof, thereby avoiding chemical or electrochemical reactions of the metallic members. This embodiment has its feature in that all the metallic members used or at least those of high chemical or electrochemical reactivity are each given a nonmetallic coating. FIG. 5 illustrates an example of this structure, in which parts 6 indicated by thick lines are the coatings and the other reference numerals are the same as those in FIG. 1. The nonmetallic coatings are those of synthetic resins such as nylon, teflon, keplon and polyethylene and waterproof coatings as of grease. The coatings can also be given through a surface treatment technique. Of these nonmetallic coatings, the waterproof coating by grease can be effected by passing the metallic members through grease tanks disposed at key points in the manufacturing system, and hence requires no appreciable changes in the fabrication process and is economical.

As described above, according to the present invention, even if water diffuses into the optical fiber cable, it is possible to effectively prevent generation of hydrogen molecules which is the dominant cause of deterioration of the transmission characteristic of the optical fiber.

Next, a description will be given of another cause of the generation of the hydrogen molecules in the optical fiber cable and a solution thereto.

Cables for international telecommunications are sometimes laid in a water depth of 8,000 meters and, in such a case, optical fibers are held in such a low-temperature, high-pressure state in which the ambient temperature is lower than 3° C. and the pressure is 800 atm. In such a state, there is a fear that the water content of air imprisoned in the optical fiber cable during its fabrication becomes saturated to produce waterdrops. Once the waterdrops are produced, they act in the same way as the aforesaid water which diffuses into the cable from the outside, causing the generation of hydrogen molecules. It is needless to say that the aforementioned solutions are effective for this, but since it is presumed that the amount of water produced is very small, it is considered effective to insert a drying agent in the cable. It is further effective to shield each optical fiber with a special metal which absorbs the generated hydrogen molecules, such as, for example, a nickel-manganese alloy.

As has been described in detail, according to the present invention, even if water diffuses into the cable, it is possible to prevent a chemical or electrochemical reaction of each metallic member forming the cable, suppressing the generation of the hydrogen molecules to avoid degradation of the transmission characteristic of the optical fiber. This has a great effect on the optical communication system which is required to have a design lifetime exceeding 20 years. Moreover, even when the optical fiber cable is mechanically cut down, if the characteristic of the optical fiber is not deteriorated, then the trouble can be removed by splicing again the cable at the broken point. This brings about a very great effect on the cable maintenance.

As described above, the present invention permits the elevation of the reliability of the optical communication system, and hence is of great industrial utility.

What we claim is:

1. An optical fiber cable comprising:
   an optical fiber unit comprising a central metallic tension-resisting member and a plurality of optical fibers disposed about said central metallic tension-resisting member
   a metallic pressure-resisting member disposed about said optical fiber unit,
   and a plurality of metallic tension-resisting wires circumferentially disposed about said metallic pressure-resisting member,
   the surface material of all metallic elements, which have an ionization tendency higher than the ionization tendency of hydrogen, being comprised of metallic material that has an ionization tendency lower than the ionization tendency of hydrogen, whereby generation of hydrogen molecules in said cable due to the presence of moisture or water therein is avoided thereby avoiding degradation of the transmission characteristic of the optical fibers by hydrogen molecules in the event of entry of moisture or water into said cable.

2. An optical fiber cable according to claim 1, in which said surface material is applied as a precoating before assembling said elements into said cable.

3. An optical fiber cable according to claim 1, in which said surface material is a metallic material which is substantially unreactive both chemically and electrochemically in the presence of water.

4. An optical fiber cable according to claim 1, in which the surfaces of said central metallic tension-resisting member, said metallic pressure-resisting member and said metallic tension-resisting wires are each covered respectively by a corresponding individual layer of said surface material, each layer having similar ionization tendencies as other layers to prevent generation of an electric field between the individual layers.

5. An optical fiber submarine cable comprising: an optical fiber unit comprising a central metallic fiber unit comprising a central tension-resisting member and a plurality of optical fibers disposed about said central metallic tension-resisting member, the optical fibers being made of a material capable of absorbing hydrogen molecules effectively causing the optical fibers to absorb light and degrade in light transmission characteristics thereof, a metallic pressure-resisting member disposed about said fiber unit, a plurality of metallic tension-resisting wires circumferentially about the metallic pressure-resisting member, at least some of the metallic elements having an ionization tendency higher than the ionization tendency of hydrogen, all the metallic elements having an ionization tendency higher than the ionization tendency of hydrogen each having a metallic surface throughout that has an ionization tendency lower than the ionization tendency of hydrogen, whereby generation of hydrogen molecules by said metallic elements in the presence of moisture or water is eliminated and absorbtion of hydrogen molecules by the optical fibers is avoided.

6. An optical fiber submarine cable according to claim 5, including means for absorbing hydrogen molecules disposed for precluding absorption of hydrogen molecules by said optical fibers.

7. An optical fiber submarine cable according to claim 6, in which said means for absorbing hydrogen molecules comprises a shield for the optical fibers.

8. An optical fiber submarine cable according to claim 7, in which said shield comprises a nickel-manganese alloy.

* * * * *